United States Patent
Leck et al.

(10) Patent No.: US 9,677,437 B2
(45) Date of Patent: Jun. 13, 2017

(54) TURBOCHARGER LUBRICANT COOLANT

(71) Applicant: Ford Global Technologies, LLC, Dearborn, MI (US)

(72) Inventors: Chris James Leck, Enfield (GB); Anthony Bernard Demots, London (GB); Paul Andrew Jones, Hadleigh (GB); John Moffat, Chelmsfo (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/561,457

(22) Filed: Dec. 5, 2014

(65) Prior Publication Data
US 2015/0176446 A1 Jun. 25, 2015

(30) Foreign Application Priority Data

Dec. 19, 2013 (GB) .................................. 1322514.9

(51) Int. Cl.
| | | |
|---|---|---|
| *F01M 11/02* | (2006.01) | |
| *F01P 3/12* | (2006.01) | |
| *F01P 11/08* | (2006.01) | |
| *F02C 6/12* | (2006.01) | |
| *F02C 7/14* | (2006.01) | |
| *F02C 7/16* | (2006.01) | |

(Continued)

(52) U.S. Cl.
CPC .............. *F01M 11/02* (2013.01); *F01P 3/12* (2013.01); *F01P 11/08* (2013.01); *F02C 6/12* (2013.01); *F02C 7/14* (2013.01); *F02C 7/16* (2013.01); *F01M 2011/021* (2013.01); *F01P 2060/12* (2013.01)

(58) Field of Classification Search
CPC ......... F01M 11/02; F01M 11/021; F02C 7/14; F02C 7/16; F02C 7/141; F02C 6/12; F01P 2060/12; F01P 3/12
USPC ........................... 60/605.3; 123/41.31, 41.33
See application file for complete search history.

(56) References Cited

U.S. PATENT DOCUMENTS

| 4,107,927 A | 8/1978 | Gordon, Jr. et al. |
| 4,704,075 A * | 11/1987 | Johnston ............... F01D 25/125 417/407 |

(Continued)

FOREIGN PATENT DOCUMENTS

| DE | 10040508 A1 | 2/2002 |
| DE | 202013000274 U1 | 2/2013 |

(Continued)

*Primary Examiner* — Phutthiwat Wongwian
*Assistant Examiner* — Jessica Kebea
(74) *Attorney, Agent, or Firm* — Julia Voutyras; McCoy Russell LLP (57) ABSTRACT

A turbocharger for an internal combustion engine comprising a housing wherein the housing comprises one or more coolant passages for receiving a coolant to cool the turbocharger and one or more lubricant passages for receiving a lubricant to lubricate the bearings. The lubricant may be the lubricant for both the turbocharger bearings and the internal combustion engine. The coolant passages and lubricant passages in the turbocharger may be arranged in the housing to transfer heat from the lubricant to the coolant such that the transfer of heat between the coolant passages and lubricant passages is sufficient to cool the lubricant to a temperature that is suitable for subsequent use in the internal combustion engine.

21 Claims, 5 Drawing Sheets

(51) Int. Cl.
*F02B 39/14* (2006.01)
*F02B 39/00* (2006.01)
*F04D 25/04* (2006.01)
*F01D 25/16* (2006.01)
*F01D 25/12* (2006.01)

(56) References Cited

U.S. PATENT DOCUMENTS

| | | | | |
|---|---|---|---|---|
| 4,977,743 A * | 12/1990 | Aihara | F01P 7/048 | 123/41.31 |
| 4,979,881 A * | 12/1990 | Gutknecht | F01D 25/125 | 417/407 |
| 5,224,853 A * | 7/1993 | Kazuo | F02B 37/18 | 60/602 |
| 5,785,493 A * | 7/1998 | Ojima | F01D 11/122 | 415/173.1 |
| 6,257,834 B1 | 7/2001 | Bremer et al. | | |
| 7,111,461 B2 * | 9/2006 | Richey | F01D 17/00 | 415/1 |
| 7,669,558 B2 * | 3/2010 | Claypole | B60K 11/02 | 123/41.51 |
| 8,997,487 B2 * | 4/2015 | Drangel | F02B 39/005 | 417/407 |
| 2007/0169747 A1 | 7/2007 | Shimizu | | |
| 2007/0193268 A1 * | 8/2007 | Noelle | F01D 25/14 | 60/605.1 |
| 2009/0130928 A1 * | 5/2009 | Taylor | F01N 3/046 | 440/88 M |
| 2010/0284824 A1 | 11/2010 | Hippen et al. | | |
| 2012/0123666 A1 * | 5/2012 | Stoffels | F01M 1/02 | 701/113 |
| 2013/0129479 A1 * | 5/2013 | Daut | F01D 25/125 | 415/110 |
| 2013/0142647 A1 * | 6/2013 | Hornbach | F01D 25/162 | 415/229 |
| 2014/0157773 A1 * | 6/2014 | Matthews | F02B 37/00 | 60/605.3 |

FOREIGN PATENT DOCUMENTS

JP 60261932 A * 12/1985
JP 2012097611 A * 5/2012

* cited by examiner

TURBOCHARGER LUBRICANT COOLANT

CROSS REFERENCE TO RELATED APPLICATIONS

The present application claims priority to Great Britain Application No. 1322514.9, "A TURBOCHARGER LUBRICANT COOLANT," filed Dec. 19, 2013, the entire contents of which are hereby incorporated by reference for all purposes.

FIELD

The present disclosure relates to a turbocharger which cools lubricant for an engine.

BACKGROUND/SUMMARY

Turbocharged engines may provide for greater fuel economy and lower carbon dioxide emission from motor vehicles by allowing for smaller and light engines to be used. These engines generally include direct injection and exhaust gas circulation. Turbocharging the engines may generate more heat, which may increase the operating temperature of the lubricant.

One example to address the increase in heat generated from turbocharged engines to reduce the temperature of the lubricant is to use an oil cooler to prevent the engine oil from degrading at the higher temperatures.

However, the inventors herein have recognized potential issues with such systems. Using an oil cooler and associated hardware may add weight, complexity, and cost to the vehicle.

One potential approach to at least partially address some of the above issues includes a system and method for a turbocharger which cools lubricant for an engine. The turbocharger comprises a housing and one or more bearing wherein the housing comprises one or more coolant passages and one or more lubricant passages. The coolant passages receive coolant to cool the turbocharger and the lubricant passages receive lubricant to lubricate the bearings. The lubricant is the lubricant for both the turbocharger bearings and the internal combustion engine. The coolant passages and lubricant passages are arranged in the housing to transfer heat from the lubricant in the lubricant passages to the coolant in the coolant passages. The arrangement is configured such that the transfer of heat between the coolant passages and lubricant passages is sufficient to cool the lubricant and maintain the lubricant at a temperature that is suitable for subsequent use in the internal combustion engine.

For example, the turbocharger with coolant passages and lubricant passages may contain coolant from the low temperature coolant circuit and the lubricant may pass through the turbocharger bearings to the engine. The lubricant is thus cooled to a temperature which reduces engine lubricant degradation.

In this way, the turbocharger may provide cooled lubricant to the engine and a separate oil cooler may be eliminated from the system. Thus, the lubricant may be below a temperature threshold, above which the lubricant may degrade.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

According to a first aspect of the present disclosure there is provided a turbocharger for an internal combustion engine, the turbocharger comprising a housing and one or more bearings, wherein the housing comprises one or more coolant passages for receiving a coolant to cool the turbocharger and one or more lubricant passages for receiving a lubricant to lubricate the bearings, the lubricant being a lubricant for both the turbocharger bearings and the internal combustion engine, wherein the coolant passages and lubricant passages are arranged in the housing to transfer heat from the lubricant in the lubricant passages to the coolant in the coolant passages, the coolant passages and lubricant passages being configured such that the transfer of heat between the coolant passages and lubricant passages is sufficient to cool the lubricant and maintain the lubricant at a temperature that is suitable for subsequent use in the internal combustion engine.

The coolant passages and lubricant passages may be configured such that there may be sufficient heat transfer to maintain the lubricant temperature at desirable working temperature, e.g. without further cooling by a further cooling device, during operation of the internal combustion engine.

One or more of the coolant passages may be provided at a compressor end of the housing. One or more of the coolant passages may be provided at a turbine end of the housing.

One or more of the coolant passages may be provided between the compressor and the lubricant passages in an axial direction of the turbocharger. The coolant passages may be configured to at least partially follow the lubricant passages in shape so as to maintain an approximately constant spacing between the coolant passage and a neighboring lubricant passage.

The turbocharger housing may be made from aluminium.

According to a second aspect of the present disclosure there is provided a cooling system for an internal combustion engine. The system may comprise the above-mentioned turbocharger. The system may further comprise the internal combustion engine. The system may not comprise a separate dedicated lubricant cooler, other than the above-mentioned turbocharger.

The system may further comprise one or more temperature sensors configured to monitor the temperature of the coolant and/or the lubricant entering and/or leaving the turbocharger. The system may further comprise one or more flow rate sensors configured to monitor the flow rate of the coolant and/or the lubricant through the turbocharger.

The system may further comprise a charge air cooler. The turbocharger and charge air cooler may be provided in a common coolant circuit. The coolant may cool the turbocharger, the charge air passing through the charge air cooler and the lubricant.

The system may further comprise a first radiator for cooling the coolant. The system may further comprise a second radiator, e.g. a low temperature radiator, for cooling the coolant. The first radiator may cool the coolant to a first temperature. The second radiator may cool the coolant to a second temperature. The second temperature may be lower than the first temperature. The second radiator may be in fluidic communication with the turbocharger coolant passage such that the coolant for the turbocharger may be cooled by the second radiator. The second radiator may also be in fluidic communication with the charge air cooler such that the coolant for the charge air cooler may be cooled by the second radiator. By contrast, coolant from the first radiator may cool the internal combustion engine.

According to a third aspect of the present disclosure there is provided a controller for controlling the above-mentioned turbocharger and/or system. The controller may be configured to monitor the temperature of the coolant and/or the lubricant entering and/or leaving the turbocharger. The controller may be configured to control the flow rate of the coolant and/or the lubricant through the turbocharger.

According to a fourth aspect of the present disclosure there is provided a method of cooling an internal combustion engine, the method comprising: providing a turbocharger for the internal combustion engine, the turbocharger comprising a housing and one or more bearings, wherein the housing comprises one or more coolant passages for receiving a coolant to cool the turbocharger and one or more lubricant passages for receiving a lubricant to lubricate the bearings, lubricating both the turbocharger bearings and the internal combustion engine with the lubricant; and transferring heat from the lubricant in the lubricant passages to the coolant in the coolant passages such that the transfer of heat between the coolant passages and lubricant passages is sufficient to cool the lubricant and maintain the lubricant at a temperature that is suitable for subsequent use in the internal combustion engine.

The method may further comprise monitoring the temperature of the coolant and/or the lubricant entering and/or leaving the turbocharger. The method may further comprise controlling the flow rate of the coolant and/or the lubricant through the turbocharger.

An engine or vehicle may comprise the above-mentioned turbocharger, the above-mentioned system and/or the above-mentioned controller.

Figure 1:
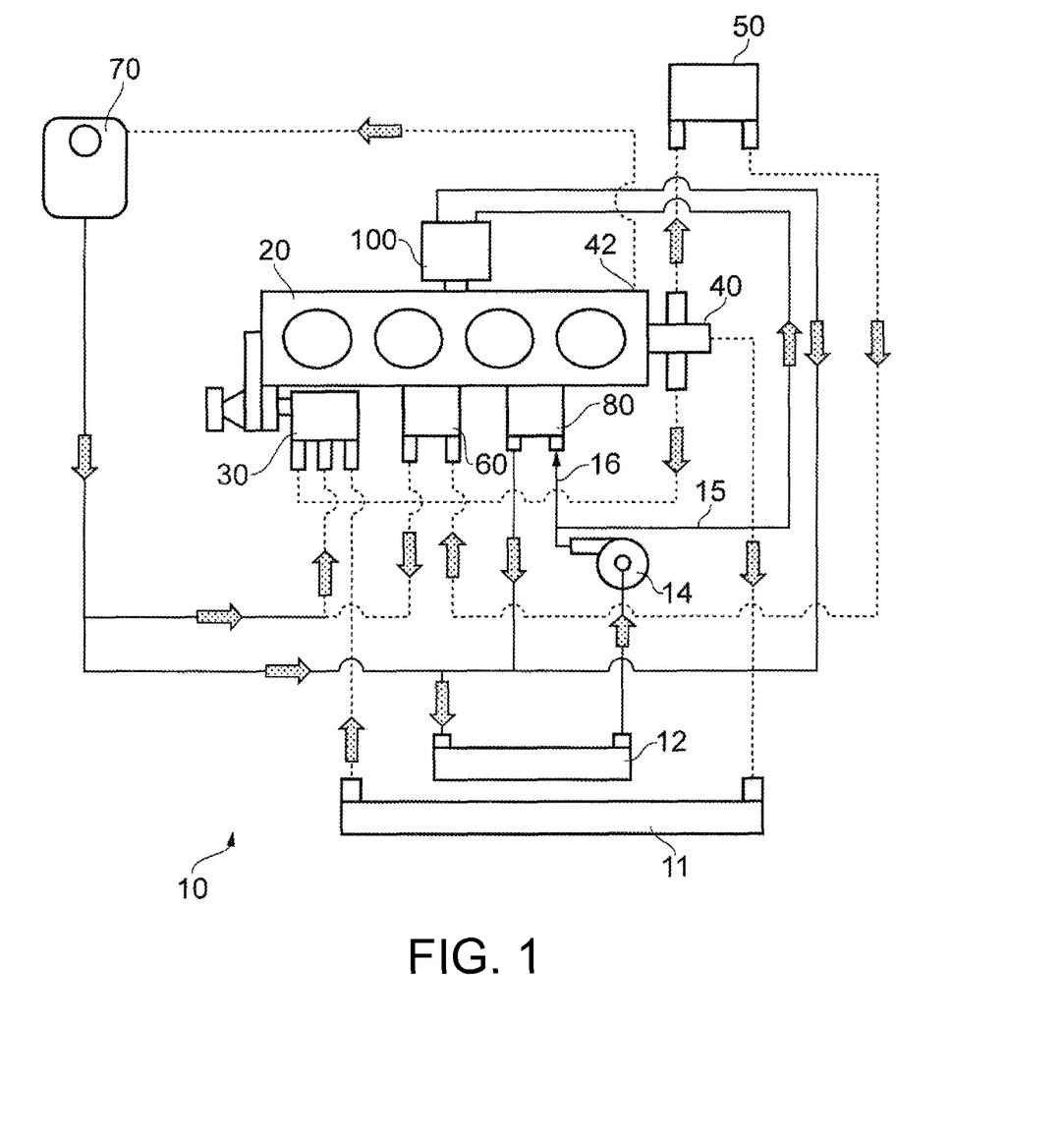
FIG. 1 is a schematic of a cooling system for an internal combustion engine according to an example of the present disclosure.

With reference to FIG. 1, the present disclosure relates to a cooling system 10 for cooling an internal combustion engine 20. As depicted, the cooling system 10 comprises a first radiator 11 and a second radiator 12. The first radiator 11 is configured to cool the coolant to a first temperature and the second radiator 12 is configured to cool the coolant to a second temperature, which is lower than the first temperature. For example, in normal running conditions, the coolant leaving the first radiator 11 can typically reach approximately 120° C. by the time it returns to the first radiator 11. By contrast, the coolant leaving the second radiator 12 can typically reach approximately 60° C. by the time it returns to the second radiator 12. (The dashed and solid lines in FIG. 1 denote coolant flow paths with hotter and cooler coolant respectively, e.g. with coolant at approximately the first and second temperatures respectively.)

As is depicted, coolant from the first radiator 11 may enter the internal combustion engine 20 through a thermostat 30 and leave through an engine outlet 40. Coolant exiting the engine outlet 40 may be recycled directly back to the thermostat 30 or the coolant may return to the thermostat 30 via the first radiator 11. The coolant may also be returned to the thermostat 30 via a restrictor 50 and a lubricant cooler 60 arranged in flow series. Coolant may also exit the engine 20 at a further outlet 42 and pass through a degas bottle 70 before being returned to the thermostat 30 or the second radiator 12.

In addition to cooling the engine 20, the cooling system 10 may also cool other ancillary components, such as a charge air cooler 80. The coolant may comprise water, in which case the charge air cooler 80 may be a Water Cooled Charge Air Cooler (WCCAC). The cooling system 10 is also configured to cool a turbocharger 100. For example, the cooling system 10 may cool one or more bearings of the turbocharger 100. The turbocharger 100 and charge air cooler 80 may be provided in a common coolant circuit with coolant from the second radiator 12 cooling both the turbocharger 100 and charge air cooler 80.

A pump 14 may be provided in flow communication with an outlet of the second radiator 12. The pump 14 may pump the flow of the coolant leaving the second radiator 12 to the charge air cooler 80 and turbocharger 100. As depicted, the coolant paths for the turbocharger 100 and charge air cooler 80 may be provided in a parallel arrangement. For example, the flow of coolant leaving the pump 14 may split into two coolant flow paths, a first flow path 15 for the turbocharger 100 and a second flow path 16 for the charge air cooler 80. The first and second flow paths 15, 16 may recombine before the coolant returns to the second radiator 12. However, in an alternative arrangement, the charge air cooler 80 and turbocharger 100 coolant paths may be provided in a series arrangement with either the charge air cooler 80 or turbocharger 100 upstream of the other component.

The engine 20 is lubricated by a lubricant such as oil. The same lubricant that lubricates the engine 20 may also lubricate the turbocharger 100, e.g. the bearings of the turbocharger. Accordingly, the engine 20 and turbocharger 100 may be provided in a common lubricant circuit. As a result, the coolant from the second radiator 12 may cool the turbocharger 100, the charge air passing through the charge air cooler 80 and the lubricant that is common to both the turbocharger 100 and engine 20.

By placing the turbocharger 100 in the lower temperature coolant circuit, the temperature of the turbocharger is reduced. The temperature of the lubricant that passes through the turbocharger is thus further reduced and the turbocharger acts as a lubricant cooler. Accordingly, with reference to FIG. 2, the lubricant cooler 60 may be omitted from the cooling system. The turbocharger 100 may then be the only dedicated source of cooling for the lubricant. As will be further described below, the turbocharger 100, for example the bearings' housing casting, may be optimized to act as the lubricant cooler. The turbocharger 100 may reduce the bulk engine lubricant temperature, thereby negating the need for a separate engine lubricant cooler.

Figure 2:
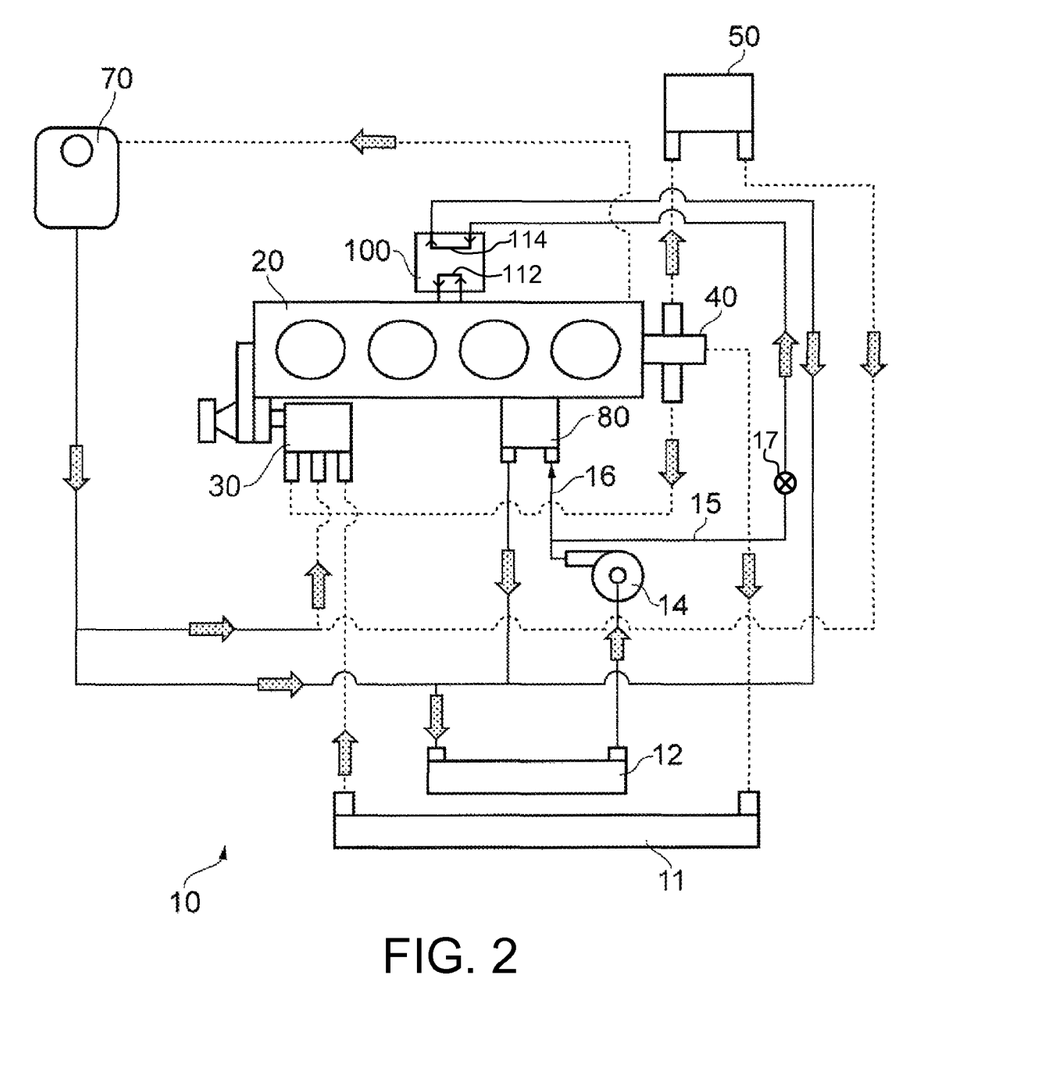
FIG. 2 is a schematic of a cooling system for an internal combustion engine according to an example of the present disclosure.

Although not depicted, the cooling system 10 may further comprise one or more temperature sensors configured to monitor the temperature of the coolant and/or the lubricant entering and/or leaving the turbocharger 100. The cooling system 10 may further comprise one or more flow rate sensors configured to monitor the flow rate of the coolant and/or the lubricant through the turbocharger 100.

Again, although not shown, a controller for controlling the cooling system 10 may be provided. The controller may be configured to monitor the temperature of the coolant and/or the lubricant entering and/or leaving the turbocharger 100. The controller may be configured to control the flow rate of the coolant and/or the lubricant through the turbocharger 100, for example so that the heat transferred between the coolant and lubricant in the turbocharger may be optimized.

One or more valves may be provided in the coolant flow paths, e.g. the first and second flow paths 15, 16, to vary the flow rate of coolant through the turbocharger 100. Similarly, one or more valves may be provided in the lubricant flow path to vary the flow rate of lubricant through the turbocharger 100. Such valves may be controlled by the controller.

Figure 3:
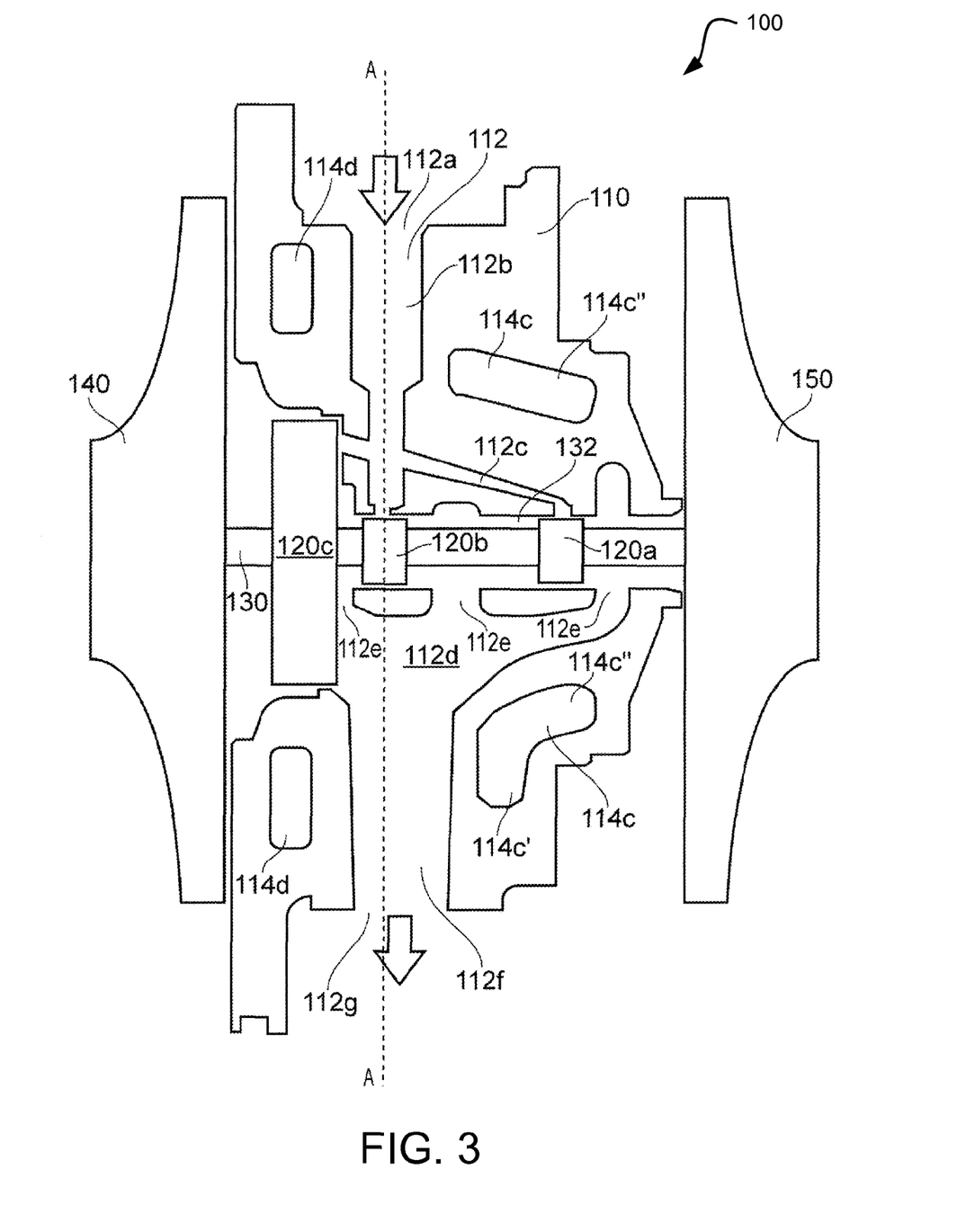
FIG. 3 is a sectional view of a turbocharger housing according to an example of the present disclosure.
Figure 4:
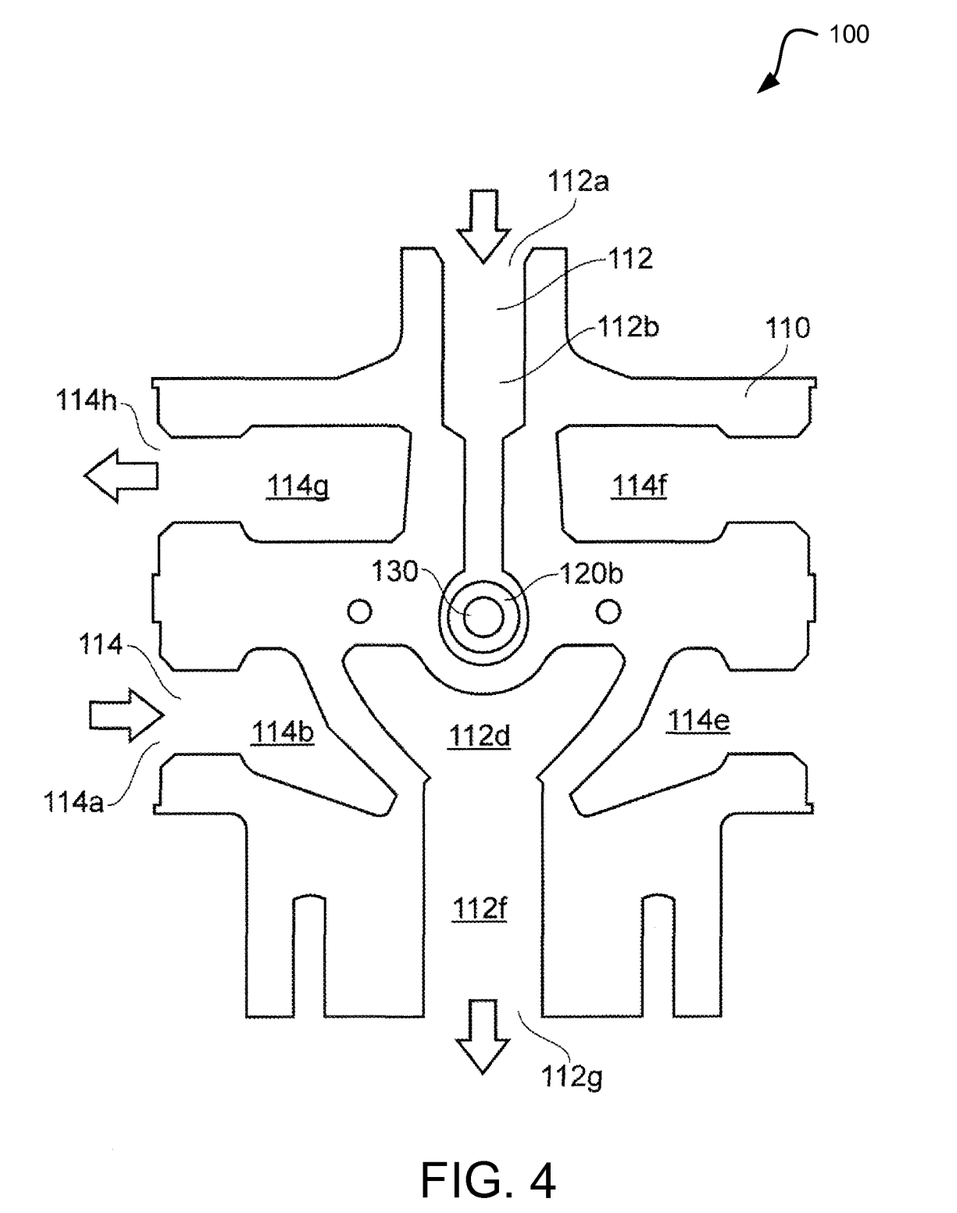
FIG. 4 is a further sectional view of the turbocharger housing taken through A-A shown in FIG. 3.

With reference to FIGS. 3 and 4, the turbocharger 100 comprises a housing 110 and one or more bearings 120 supporting a shaft 130 in a cavity 132. A compressor 140 and a turbine 150 are provided at either end of the shaft 130. Although not shown, it will be appreciated that further housings may be provided to house the compressor 140 and turbine 150. Such housings may be separate from or integral with the housing 110. Furthermore, in the particular arrangement shown, the turbocharger 100 comprises first and second radial bearings 120a, 120b and an axial thrust bearing 120c, although other bearing arrangements may be equally envisaged.

The housing 110 comprises one or more lubricant passages 112 for receiving a lubricant to lubricate the bearings 120. As mentioned above, the lubricant lubricates both the turbocharger bearings 120 and the internal combustion engine 20. The lubricant passages 112 comprise an inlet 112a, which leads to an inlet passage 112b. The inlet passage 112b may extend substantially radially. The inlet passage 112b may lead to one or more of the bearings 120, such as bearing 120b. One or more further passages 112c may be provided which fluidically connect the inlet passage 112b to one or more further bearings 120a, 120c. The further passages 112c may be oblique to the inlet passage 112b. An outlet chamber 112d may receive lubricant from the bearings 120. The outlet chamber 112d may extend at least partially circumferentially about the shaft and may have one or more openings 112e into the shaft cavity 132. The openings 112e may be axially spaced apart. The outlet chamber 112d may fluidically connect with an outlet passage 112f, which may extend substantially radially. The outlet passage 112f may lead to a lubricant outlet 112g.

The housing 110 further comprises one or more coolant passages 114 for receiving the coolant to cool the turbocharger 100. The coolant passages 114 comprise an inlet 114a, which leads to a coolant inlet passage 114b. The coolant inlet passage 114b fluidically connects the coolant inlet 114a to first and second annular coolant passages 114c, 114d, which extend substantially circumferentially about a longitudinal axis of the shaft 130. The first and second annular coolant passages 114c, 114d are axially spaced apart either side of the coolant inlet 114a and/or lubricant inlet passage 112b. Accordingly, the coolant inlet passage 114b extends in a first direction with an axial component (i.e. in the longitudinal direction of the shaft 130) to the first annular coolant passage 114c and in a second direction with an axial component to the second annular coolant passage 114d.

The first annular coolant passage 114c is provided at a turbine end of the housing 110. In addition, the first annular coolant passage 114c is provided radially outer of the lubricant further passage 112c and outlet chamber 112d. The first annular coolant passage 114c may be configured to substantially follow the direction and shape of the lubricant further passage 112c and outlet chamber 112d so as to maximize the heat transfer between the passages. For example, as depicted in FIG. 3, a cross-section of the first annular coolant passage 114c may comprise a radially extending portion 114c', which is configured to at least partially follow the lubricant outlet passage 112f. The radially extending portion 114c' may only be present in the region of the lubricant outlet passage 112f and as such may not be present around the entire circumference of the first annular coolant passage 114c. The cross-section of the first annular coolant passage 114c may otherwise comprise a radially and axially extending portion 114c", which is configured to at least partially follow the shape of the lubricant further passage 112c and the outlet chamber 112d. The radially and axially extending portion 114c" may substantially extend over the length of the lubricant further passage 112c and may maintain an approximately constant spacing between the first annular coolant passage 114c and the lubricant further passage 112c. The radially and axially extending portion 114c" may also extend such that it thermally communicates with the lubricant inlet passage 112b, which further increases the heat transfer between the passages.

The second annular passage 114d is provided at a compressor end of the housing 110. For example, the second annular passage 114d is provided axially between the compressor 140 and the various lubricant passages 112, for example the lubricant inlet and/or outlet passages 112b, 112f. The second annular passage 114d may be configured to substantially follow the direction and shape of the lubricant inlet and outlet passages 112b, 112f so as to maximize the heat transfer between the passages. For example, as depicted in FIG. 3, a cross-section of the second annular coolant passage 114d extends in a radial direction to at least partially follow the lubricant inlet and outlet passages 112b, 112f. Thus, the lubricant may be cooled to below a threshold temperature via heat exchange between the lubricant and coolant in the passages within the turbocharger housing.

The first and second annular coolant passages 114c, 114d may be further fluidically connected by connecting passages 114e, 114f. The connecting passages 114e, 114f may extend in a direction with an axial component.

The first and second annular coolant passages 114c, 114d may also be fluidically connected to a coolant outlet passage 114g. The coolant outlet passage 114g may lead to a coolant outlet 114h. In an arrangement similar to that for the coolant inlet passage 114b, the coolant outlet passage 114g extends in a first direction with an axial component to the first annular coolant passage 114c and in a second direction with an axial component to the second annular coolant passage 114d.

As depicted in FIGS. 3 and 4, the coolant inlet and outlet 114a, 114h may be in the same radial plane as the lubricant inlet and outlet 112a, 112g. The coolant inlet and outlet 114a, 114h may be circumferentially spaced apart from the lubricant inlet and outlet 112a, 112g. It may be appreciated that the coolant passages 114, for example the coolant inlet and outlet passages 114b, 114g, may be arranged to avoid intersecting the lubricant passages 112, for example the lubricant inlet and outlet passages 112b, 112f.

As depicted in FIG. 3, the coolant passages 114 may be configured to at least partially follow the lubricant passages 112 in shape so as to maintain an approximately constant spacing between the coolant passage 114 and a neighboring lubricant passage 112. For example, an approximately constant spacing between the lubricant passages and coolant passages may allow for improved heat exchange between the lubricant and the coolant. To further facilitate heat transfer between the coolant and lubricant passages 112, 114, the turbocharger housing 110 may be made from aluminium.

In use, coolant, e.g. from the second radiator 12, flows into the coolant inlet 114a, through the inlet passage 114b to both the first and second annular coolant passages 114c, 114d. The coolant then flows substantially circumferentially around the first and second annular coolant passages 114c, 114d cooling the lubricant in the adjacent lubricant passages 112. The coolant may also flow between the first and second annular coolant passages 114c, 114d by virtue of the connecting passages 114e, 114f. The coolant may flow from the first and second annular coolant passages 114c, 114d to the coolant outlet passage 114g before exiting through the coolant outlet 114h. The coolant may then for example return to the second radiator 12.

The coolant passages 114 and lubricant passages 112 are arranged in the housing 110 to transfer heat from the lubricant in the lubricant passages 112 to the coolant in the coolant passages 114. The coolant passages 114 and lubricant passages 112 may be configured such that the transfer of heat between the coolant passages 114 and lubricant passages 112 is sufficient to cool the lubricant and maintain the lubricant at a temperature that is suitable for subsequent use in the internal combustion engine 20. In other words, the coolant passages 114 and lubricant passages 112 may be configured such that there may be sufficient heat transfer to maintain the lubricant temperature at a desirable working temperature during operation of the engine 20. Further cooling by a dedicated cooling device such as the lubricant cooler 60 may not thus be required. Thus, heat may be transferred from the lubricant to the coolant via passages within the turbocharger housing to provide lubricant at a temperature below a threshold.

Figure 5:
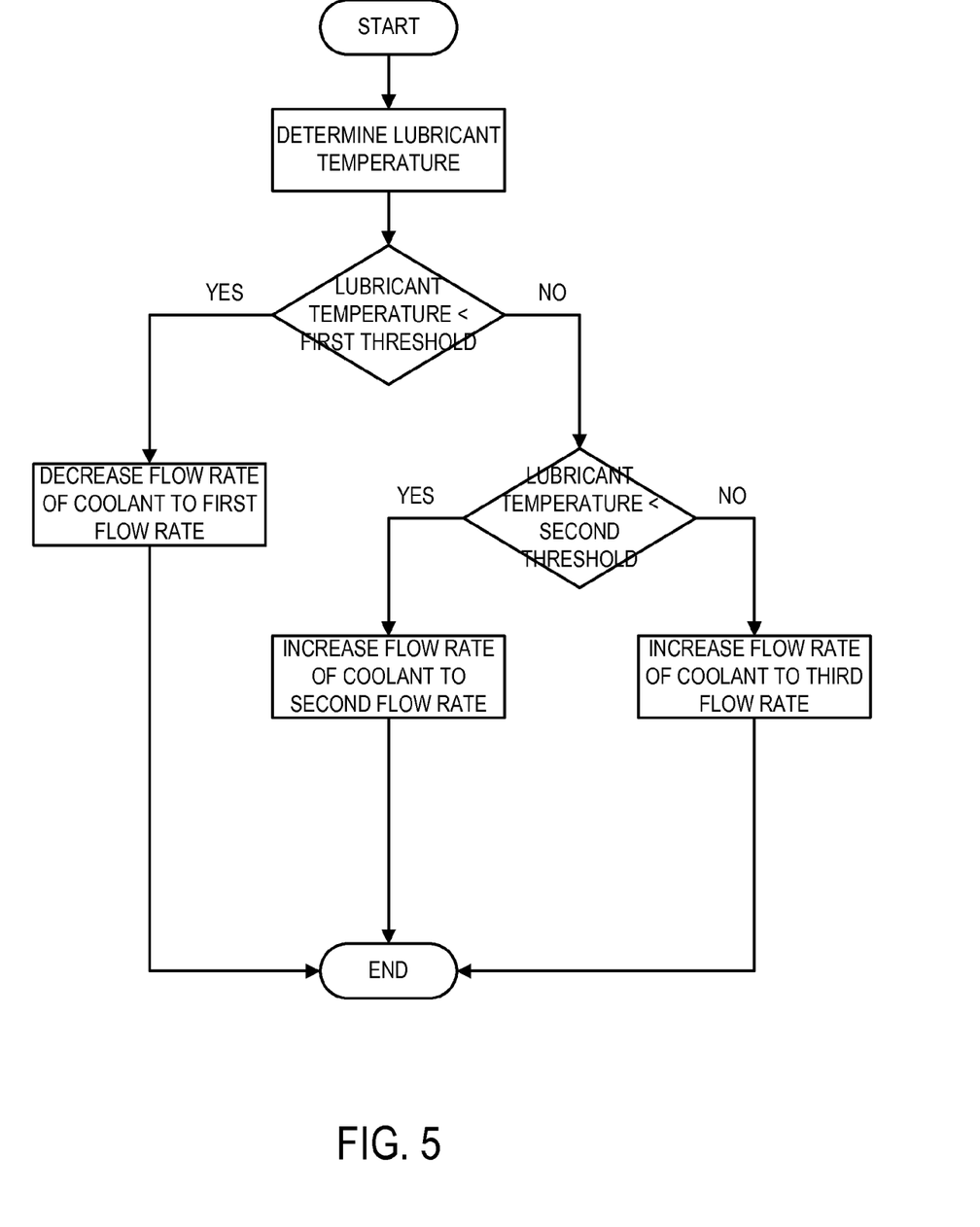
FIG. 5 is an example method for a lubricant and cooling system comprising a turbocharger according to the present disclosure.

Turning to FIG. 5, an example method 500 is provided for controlling the flow rate of the coolant based on the temperature of the lubricant. In other examples, the flow rate of both the coolant and lubricant may be adjusted in response to the temperature of the lubricant. In yet another example, the flow rate may be adjusted in response to the temperature of the lubricant and the temperature of the coolant. The flow rate of the coolant and/or lubricant may be adjusted via a valve provided in the coolant flow path and/or lubricant flow path respectively. In another example, the flow rate of the coolant and/or lubricant may be adjusted via the pump rate.

At 502, the method may determine the lubricant temperature. For example, the temperature of the lubricant entering the turbocharger from the engine may be monitored by a temperature sensor positioned in the lubricant passage.

At 504, the method may determine if the lubricant temperature is below a first threshold. For example, the first threshold may be a temperature at which the lubricant does not need cooling. In one example, at engine start up, the lubricant may need to be heated by the engine to reach an optimal operating temperature. Thus, during engine warm up, cooling of the lubricant via the turbocharger may not be needed.

If yes at 504, the lubricant temperature is below a first threshold, the method may decrease the flow rate of coolant to a first flow rate at 506. For example, no flow of coolant may be used to allow the lubricant to warm up to an operating temperature. In this way, the coolant may be stagnant and the lubricant is not cooled unnecessarily during engine operating conditions wherein the lubricant may need to warm up.

If no at 504, the lubricant temperature is not below a first threshold, the method may proceed to 508 and determine if the lubricant temperature is less than a second threshold. In one example, the second threshold may be set as an upper temperature threshold, above which lubricant degradation may occur. In another example, the second threshold may be set to be higher than the optimal operating temperature but lower than the lubricant degradation temperature to better enable the lubricant temperature to be kept near optimal operating temperature.

If yes at 508, the lubricant temperature is below the second threshold, the method may increase the flow rate of the coolant to a second flow rate at 510. For example, the second flow rate may be higher than the first flow rate. Further, the second flow rate may be set to provide a partial flow of coolant according to a desired heat transfer rate between the coolant and lubricant to maintain the current lubricant temperature.

If no at 508, the lubricant temperature is not below the second threshold, the method may increase the flow rate of the coolant to a third flow rate at 512. For example, the third flow rate may be a maximum threshold flow rate for the coolant valve or coolant pump. For example, a full flow of coolant may be used to provide maximum heat transfer between the coolant and lubricant. Thus, a high rate of heat transfer between the coolant and lubricant may occur which may reduce the lubricant temperature.

Example method 500 provides an overview of the operation of a turbocharger comprising a housing wherein the housing comprises one or more coolant passages and one or more lubricant passages as described in FIGS. 3 and 4 above.

The turbocharger of the present disclosure is advantageous since deleting the lubricant cooler, also referred to as oil cooler, pipe-work, seals and associated hardware results in a significant cost and weight saving. Fewer parts may be required and the complexity of the cooling system is reduced. By contrast, adapting the turbocharger in the manner set out above will have minimal impact on the cost, weight or complexity.

It will be appreciated by those skilled in the art that although the invention has been described by way of example with reference to one or more examples, it is not limited to the disclosed examples and that alternative examples could be constructed without departing from the scope of the invention as defined by the appended claims.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions may be carried out by executing the instructions in a system including the various engine hardware components in combination with the electronic controller.

In another representation, a method of cooling an internal combustion engine, the method comprising: providing a turbocharger for the internal combustion engine, the turbocharger comprising a housing and one or more bearings, wherein the housing comprises one or more coolant passages for receiving a coolant to cool the turbocharger and one or more lubricant passages for receiving a lubricant to lubricate the bearings, lubricating both the turbocharger bearings and the internal combustion engine with the lubricant; and transferring heat from the lubricant in the lubricant passages to the coolant in the coolant passages such that the transfer of heat between the coolant passages and lubricant passages is sufficient to cool the lubricant and maintain the lubricant at a temperature that is suitable for subsequent use in the internal combustion engine. The method may further include monitoring the temperature of the coolant and/or the lubricant entering and/or leaving the turbocharger, and/or controlling the flow rate of the coolant and/or the lubricant through the turbocharger.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger for an internal combustion engine, the turbocharger comprising:
a housing and one or more bearings, wherein the housing comprises a plurality of coolant passages for receiving a coolant to cool the turbocharger, the plurality of coolant passages including a coolant inlet leading to a coolant inlet passage, a coolant outlet passage leading to a coolant outlet, and first and second annular coolant passages axially spaced apart from the coolant inlet on either side of the coolant inlet, the housing further comprising a plurality of lubricant passages for receiving a lubricant to lubricate the bearings including a lubricant inlet leading to a lubricant inlet passage and a lubricant outlet passage leading to a lubricant outlet, the lubricant being a lubricant for both the turbocharger bearings and the internal combustion engine,
wherein the coolant passages and lubricant passages are arranged in the housing to transfer heat from the lubricant in the lubricant passages to the coolant in the coolant passages, the coolant passages and lubricant passages being configured such that the transfer of heat between the coolant passages and lubricant passages is sufficient to cool the lubricant and maintain the lubricant at a temperature that is suitable for subsequent use in the internal combustion engine,
wherein the coolant inlet, the coolant outlet, the lubricant inlet, and the lubricant outlet are on a radial plane, and
wherein the radial plane is defined as perpendicular to a longitudinal axis of a turbocharger shaft.

2. The turbocharger of claim 1, wherein the second annular coolant passage is provided between the lubricant inlet passage and a compressor end of the housing in an axial direction of the turbocharger and wherein the first annular coolant passage is provided between, and spaced apart from, the lubricant inlet passage and a turbine end of the housing in the axial direction of the turbocharger.

3. The turbocharger of claim 1, wherein the coolant inlet passage extends in a first direction with an axial component to the first annular coolant passage and in a second direction with an axial component to the second annular coolant passage.

4. The turbocharger of claim 1, wherein the plurality of lubricant passages comprises a further lubricant passage oblique to the lubricant inlet passage, a cross-section of the first annular coolant passage comprises a radially extending portion which is configured to at least partially follow the lubricant outlet passage and which is not present around the entire circumference of the first annular coolant passage, and wherein the cross-section of the first annular coolant passage otherwise comprises a radially and axially extending portion which is configured to at least partially follow the shape of the further lubricant passage and maintain an approximately constant spacing between the first annular coolant passage and the further lubricant passage.

5. The turbocharger of claim 1, wherein the coolant inlet and the coolant outlet are circumferentially spaced apart from the lubricant inlet and the lubricant outlet.

6. A system for an internal combustion engine comprising:
a lubricant circuit comprising a lubricant, wherein the lubricant circuit has no separate oil cooler;
a high temperature coolant circuit comprising a first radiator;
a low temperature coolant circuit comprising a second radiator; and
a turbocharger comprising a housing and one or more bearings, wherein the housing comprises one or more coolant passages for receiving a coolant to cool the turbocharger, wherein the second radiator is in fluidic communication with the coolant passages such that the coolant for the turbocharger is cooled by the second radiator, the coolant passages comprising a coolant inlet leading to a coolant inlet passage and a coolant outlet passage leading to a coolant outlet, and one or more lubricant passages for receiving the lubricant from the lubricant circuit to lubricate the one or more bearings, the lubricant passages comprising a lubricant inlet leading to a lubricant inlet passage and a lubricant outlet passage leading to a lubricant outlet, the lubricant lubricating both the one or more bearings and the internal combustion engine, wherein the coolant inlet, the coolant outlet, the lubricant inlet, and the lubricant outlet are on a radial plane, wherein the radial plane is defined as perpendicular to a longitudinal axis of a turbocharger shaft, the coolant inlet and the coolant outlet are circumferentially spaced apart from the lubricant inlet and the lubricant outlet, wherein the lubricant flows directly from the turbocharger to the internal combustion engine, and wherein the first radiator cools the coolant to a first temperature and the second radiator cools the coolant to a second temperature, the second temperature being lower than the first temperature.

7. The system of claim 6, wherein the turbocharger coolant passages and lubricant passages are arranged in the housing to transfer heat from the lubricant in the lubricant passages to the coolant in the coolant passages, the coolant passages and lubricant passages being configured such that the transfer of heat between the coolant passages and lubricant passages is sufficient to cool the lubricant and maintain the lubricant at a temperature that is suitable for subsequent use in the internal combustion engine.

8. The system of claim 6, further comprising one or more temperature sensors configured to monitor a temperature of the coolant and/or the lubricant entering and/or leaving the turbocharger.

9. The system of claim 6, the system further comprising one or more flow rate sensors configured to monitor a flow rate of the coolant and/or the lubricant through the turbocharger.

10. The system of claim 6, the system further comprising a charge air cooler, wherein the turbocharger and charge air cooler are provided in the low temperature coolant circuit such that the coolant cools the turbocharger, the charge air passing through the charge air cooler, and the lubricant.

11. The system of claim 6, wherein the one or more coolant passages further comprise first and second annular coolant passages axially spaced apart from the coolant inlet on either side of the coolant inlet.

12. The system of claim 6, further comprising a controller for controlling the turbocharger wherein the controller is configured to monitor a temperature of the coolant and/or the lubricant entering and/or leaving the turbocharger and wherein the controller is configured to control a flow rate of the coolant and/or the lubricant through the turbocharger.

13. A method of cooling an engine comprising:
compressing air via a turbocharger having a housing and bearings, the housing including a plurality of coolant passages including a coolant inlet leading to a coolant inlet passage, a coolant outlet passage leading to a coolant outlet, and first and second annular coolant passages axially spaced apart from each other and from the coolant inlet on either side of the coolant inlet, with the coolant inlet, the coolant outlet, a lubricant inlet, and a lubricant outlet being on a radial plane, and the radial plane being defined as perpendicular to a longitudinal axis of a turbocharger shaft;
cooling the turbocharger via the first and second annular coolant passages with coolant as well as cooling separate lubricant passages coupled with turbocharger bearings with lubricant;
lubricating both the turbocharger bearings and the engine with the lubricant; and
adjusting a coolant flow through the coolant passages responsive to a lubricant temperature.

14. The method of claim 13, wherein there is no flow of coolant when the temperature of the lubricant is below a first threshold.

15. The method of claim 14, wherein there is a full flow of coolant when the temperature of the lubricant is above a second threshold.

16. The method of claim 15, wherein there is a partial flow of coolant when the temperature of the lubricant is above the first threshold and below the second threshold, and wherein the partial flow of coolant is less than the full flow of coolant but is not stagnant.

17. The method of claim 13, wherein the engine is a direct fuel injection internal combustion engine.

18. The method of claim 14, wherein the no flow of coolant includes the coolant being stagnant.

19. The method of claim 13, wherein the second annular coolant passage is provided between a lubricant inlet passage and a compressor end of the housing in an axial direction of the turbocharger and wherein the first annular coolant passage is provided between the lubricant inlet passage and a turbine end of the housing in the axial direction of the turbocharger.

20. The method of claim 13, wherein the second annular coolant passage is provided between a lubricant inlet passage and a compressor end of the housing in an axial direction of the turbocharger and wherein the first annular coolant passage is provided between the lubricant inlet passage and a turbine end of the housing in the axial direction of the turbocharger.

21. The method of claim 13, wherein the separate lubricant passages comprise a lubricant inlet and a lubricant outlet which are in the same radial plane as, and circumferentially spaced apart from, the coolant inlet and the coolant outlet.

* * * * *